United States Patent [19]
Lim et al.

[11] Patent Number: 6,014,660
[45] Date of Patent: *Jan. 11, 2000

[54] METHOD AND APPARATUS FOR CLIENT-SENSITIVE NAME RESOLUTION USING DNS

[75] Inventors: Swee B. Lim, Cupertino; Sanjay R. Radia, Fremont; Thomas K. Wong, Pleasanton, all of Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/763,234

[22] Filed: Dec. 9, 1996

[51] Int. Cl.$^7$ .................. G06F 17/00; G06F 9/00
[52] U.S. Cl. ............... 707/3; 395/200.3; 395/200.47; 395/200.53; 395/200.79; 395/200.33; 707/200; 707/205; 707/10
[58] Field of Search .................. 707/1–10, 100, 707/200–206; 395/200.3–200.74, 200.78–200.8

[56] References Cited

U.S. PATENT DOCUMENTS

| | | | |
|---|---|---|---|
| 5,533,115 | 7/1996 | Hollenbach et al. | 379/220 |
| 5,544,320 | 8/1996 | Konrad | 395/200.33 |
| 5,566,278 | 10/1996 | Patel et al. | 395/114 |
| 5,617,540 | 4/1997 | Civanlar et al. | 395/200.57 |
| 5,696,901 | 12/1997 | Konrad | 1/1 |
| 5,713,075 | 1/1998 | Threadgill et al. | 455/427 |

FOREIGN PATENT DOCUMENTS 0 648 038 A2  4/1995  European Pat. Off. .

OTHER PUBLICATIONS

P. Mockapetris, "Domain Names—Implementation and Specification," ISI, Nov. 1987.

P. Mockapetris, "Domain Names—Concepts and Facilities," ISI, Nov. 1987.

Larry L. Peterson, "A Yellow–Pages Service for a Local–Area Network," Copyright 1988, pp. 235–242, XP–002061706.

*Primary Examiner*—Thomas G. Black
*Assistant Examiner*—David Yiuk Jung
*Attorney, Agent, or Firm*—Graham & James LLP

[57] ABSTRACT

A method and apparatus for performing client-sensitive DNS translations includes the steps of receiving a translation request by a DNS server. The DNS server examines the translation request to determine if a record exists within the DNS server that associates the symbolic name included in the translation request with an IP record. If such a record exists, the IP address is returned as the translation. If not, the DNS server determines whether reflective client-sensitive translation is required. In the affirmative case, the request is reflected to back to the client where client-sensitive translation is performed and returned to the DNS server. If client-sensitive translation is not required, the DNS server determines whether non-reflective client-sensitive translation is required. If so, the requested translation is forwarded to a special DNS server, along with information that identifies the client system requesting translation. The special DNS server then performs the requested translation and returns the translation to the DNS server. When client-sensitive translation is not required, the DNS server performs iterative or recursive DNS translation.

32 Claims, 5 Drawing Sheets

METHOD AND APPARATUS FOR CLIENT-SENSITIVE NAME RESOLUTION USING DNS

RELATED APPLICATIONS

The following co-pending patent applications, which were filed on Dec. 9, 1996, are related to the subject application and are herein incorporated by reference:

1. Application Ser. No. 08/762,393, entitled "Method and Apparatus for Access Control in a Distributed Multiserver Network Environment" of Thomas Wong, Sanjay R. Radia, Swee Boon Lim, Panagiotis Tsirigotis, and Rob Goedman now U.S. Pat. No. 5,835,727.

2. Application Ser. No. 08/762,402, entitled "Method and Apparatus for Dynamic Packet Filter Assignments" of Sanjay R. Radia, Swee Boon Lim, Panagiotis Tsirigotis, Thomas Wong, and Rob Goedman now U.S. Pat. No. 5,848,233.

3. Application Ser. No. 08/763,289, entitled "Load Balancing and Failover of Network Services" of Swee Boon Lim, Ashish Singhai, and Sanjay R. Radia.

4. Application Ser. No. 08/763,068, entitled "Secure DHCP Server" of Swee Boon Lim, Sanjay R. Radia, Thomas Wong, Panagiotis Tsirigotis, and Rob Goedman now U.S. Pat. No. 5,884,024.

5. Application Ser. No. 08/763,212, entitled "A Method to Activate Unregistered Systems in a Distributed Multiserver Network Environment" of Thomas Wong and Sanjay R. Radia.

6. Application Ser. No. 08/762,709, entitled "A Method and Apparatus for Assignment of IP Addresses" of Thomas Wong, Swee Boon Lim, Sanjay R. Radia, Panagiotis Tsirigotis, and Rob Goedman.

7. Application Ser. No. 08/762,933, entitled "A Method for Using DHCP to Override Learned IP Addresses in a Network" of Sanjay R. Radia, Thomas Wong, Swee Boon Lim, Panagiotis Tsirigotis, Rob Goedman, and Mike Patrick.

8. Application Ser. No. 08/762,705, entitled "Dynamic Cache Preloading Across Loosely Coupled Administrative Domains" of Panagiotis Tsirigotis and Sanjay R. Radia.

The following co-pending patent application is related to the subject application and is herein incorporated by reference:

9. U.S. application Ser. No. 08/673,951, filed Jul. 1, 1996, entitled "A Name Service for a Redundant Array of Internet Servers" of Swee Boon Lim.

FIELD OF THE INVENTION

The present invention relates generally to distributed computing and computer networking. More specifically, the present invention is a method and apparatus for providing for a network name server that accounts for the identity of clients that request name resolution.

BACKGROUND OF THE INVENTION

In recent years, the use of TCP/IP computer networks has become well known. In TCP/IP networks, host systems and other objects within the network are identified by thirty-two bit numbers, known as Internet Protocol Addresses (IP addresses). IP addresses provide a simple mechanism for identifying the source and destination of messages sent using TCP/IP networks. IP addresses are not, however, easy for humans to recognize or remember. As a result, objects within TCP/IP networks may be given human readable names that are associated with IP addressees. When a user wishes to access a particular object, the human readable name is used. That name is then translated into an IP address that may be understood by the various systems that make up the network. A symbolic name that correspond to an IP address is said to be "bound" to that address. More than one symbolic name may be bound to a single IP address.

The use of symbolic names creates a need for services or methods for translating symbolic names to corresponding IP addresses. One such method is implemented by providing each host system on a network with a database of symbolic names and corresponding IP addresses. When a symbolic name requires translation, the host system doing the translation simply looks up the required IP address in its database. This mechanism, although functional, suffers from a number of disadvantages. One of these disadvantages is the difficulty associated with maintaining separate databases on each host system. Generally, each of these databases must be separately updated each time a binding is changed in the network. Unfortunately, in many networks, bindings tend to change on an almost continuous basis, as network objects are added or deleted or as changes are made to symbolic names or IP addresses.

The difficulty associated with maintaining separate databases has led to the use of centralized databases that are located on one of more database server systems. A host system that needs to translate a symbolic name queries one of the database server systems which then provides the requested IP address. Use of networked databases of this type, such as provided by the Network Information Service of Sun Microsystems Inc., has greatly simplified the maintenance and administration of name databases.

In practice, most TCP/IP networks are organized using a hierarchical structure. For example, in a university environment, the systems in the engineering department may be linked using a TCP/IP network. Similarly, the mathematics systems may be linked using their own TCP/IP network. The engineering and mathematics networks may be linked using a university wide TCP/IP network and the university network may be part of a larger network, such as the Internet.

To accommodate the hierarchical structure of TCP/IP networks, the basic concept of a networked name database has been extended to function in a similar hierarchical fashion. Thus, a host system that needs to translate a symbolic name queries a local database server system. If the local database server recognizes the symbolic name for which a translation is required, the database server returns the requested IP address. In the alternative, under appropriate circumstances, the local database server will pass the symbolic name requiring translation to a name server located at the next level in the network hierarchy. This type of recursive translation may continue until a database server is reached that can perform the requested translation. In modern TCP/IP networks, this method for translating symbolic names is known as a Domain Name Service (DNS) with the database server providing the translation known as DNS servers.

One of the features of DNS is consistency. Thus, barring changes in the network, a DNS server will always return the same IP address for a given symbolic name. In some cases, however, this type of consistency has been found to be a disadvantage. For example, in many networks, mail is handled by a mail server. Systems that need to send or receive mail find the IP address of the mail server by querying the local DNS server. This is most conveniently done if symbolic name "mail" (or some similar name) is set to correspond to the IP address of the mail server. If the network includes a large number of host systems, however, it may not be practical to have a single mail server. Instead, a group of mail servers must be defined and the host systems must be divided between the different mail servers. Traditionally, this has been accomplished by assigning a different symbolic host name, such as "mail1" and "mail2" to each mail server. Each host system is then separately configured to use the symbolic name of one such mail server. In these cases, it would be more practical if the DNS server could handle the task of assigning host systems to mail servers without the host systems knowing a specific symbolic name for their particular mail server. The ability of the DNS server to assign host systems to mail servers would also simplify the task of moving mailboxes between mail servers.

Consistent name translation has also proven to be a disadvantage for allocation of preferred resources within a network. For example, many large networks include a group of news servers. To balance the workload of the various news servers, it is preferable to split the host systems between the news servers by assigning a preferred news server for each host system. When the preferred news server is unavailable, each host system may have an alternate new server. If the alternative news server is not available, each host may have an alternate to the alternate news server. Once again it would be convenient if the DNS server could handle the task of assigning host systems to their preferred news servers or alternate news servers without the host systems knowing a specific name for their particular news server or alternate news server.

Access control is yet another situation where consistent name translation has proven to be less than ideal. For example, it may be desirable to limit the access of some network users to host systems that are internal to the network. At the same time, it may be desirable to allow other users to access internal systems as well as host systems included in an external network, such as the Internet. Generally, this type of access control may be provided by using two proxy servers with each proxy server providing access control to one of the two classes of users. In traditional DNS systems, this would require each host to know the name of the correct proxy server. Once again, it would be convenient if the DNS server could handle the task of assigning host systems to proxy servers without the host systems knowing a specific name for their particular proxy server.

SUMMARY OF THE INVENTION

The present invention is a method and apparatus for providing a network name server that is sensitive to the identity of the clients requesting name resolution. A preferred embodiment of the present invention includes a DNS server that receives requests from client processes for translation of symbolic names to IP addresses. When the DNS server receives a request for translation, it examines the symbolic name for which translation is requested. If the symbolic name is a name that requires client-sensitive translation, the server forwards the request to a special daemon process executing on the client that had originally requested translation. The daemon process then translates the symbolic name using a set of bindings that are preloaded into the daemon process. The IP address corresponding to the symbolic name is then returned to the DNS server that, in turn, returns the IP address to the requesting client.

In another preferred embodiment of the present invention, the DNS server forwards symbolic names requiring client-sensitive translation to a special DNS server. The forwarded request includes the identity of the client requesting the translation. The special DNS server then performs the requested translation using a set of bindings internal to the special DNS server to generate an IP address. The IP address is then returned to the DNS server and, in turn, returned to the requesting client.

For either of the two embodiments described above, the translation provided may be to a specific IP address, such as the IP address of the particular mail server or proxy server assigned to the client system requesting translation. Alternatively, the translation may be to a preferred IP address such as an address of a preferred news server. In such cases, an address of an alternate news server will be provided if the preferred news server is unavailable. It should also be appreciated that each of the embodiments described above may be used as part of a single DNS server with each method providing translations for a specified set of symbolic names.

In accordance with the purpose of the invention, as embodied and broadly described herein, the present invention is a method for providing client-sensitive translation of symbolic names to addresses, the method comprising the following steps performed by a DNS server system, of: receiving a request for translation from a client computer system, the request for translation including a symbolic name to be translated, forwarding the translation request to the client computer system if reflective client-sensitive translation is required, receiving a translation from the client computer system, the translation including an address corresponding to the symbolic name included in the translation request, and returning the translation to the client computer system.

In further accordance with the purpose of the invention, as embodied and broadly described herein, the present invention is a method for providing client-sensitive translation of symbolic names to addresses, the method comprising the following steps performed by a DNS server system, of: receiving a request for translation from a client computer system, the request for translation including a symbolic name to be translated, forwarding the translation request to a special DNS server system if non-reflective client-sensitive translation is required, receiving a translation from the special DNS server system, the translation including an address corresponding to the symbolic name included in the translation request, and returning the translation to the client computer system.

Advantages of the invention will be set forth, in part, in the description that follows and, in part, will be understood by those skilled in the art from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
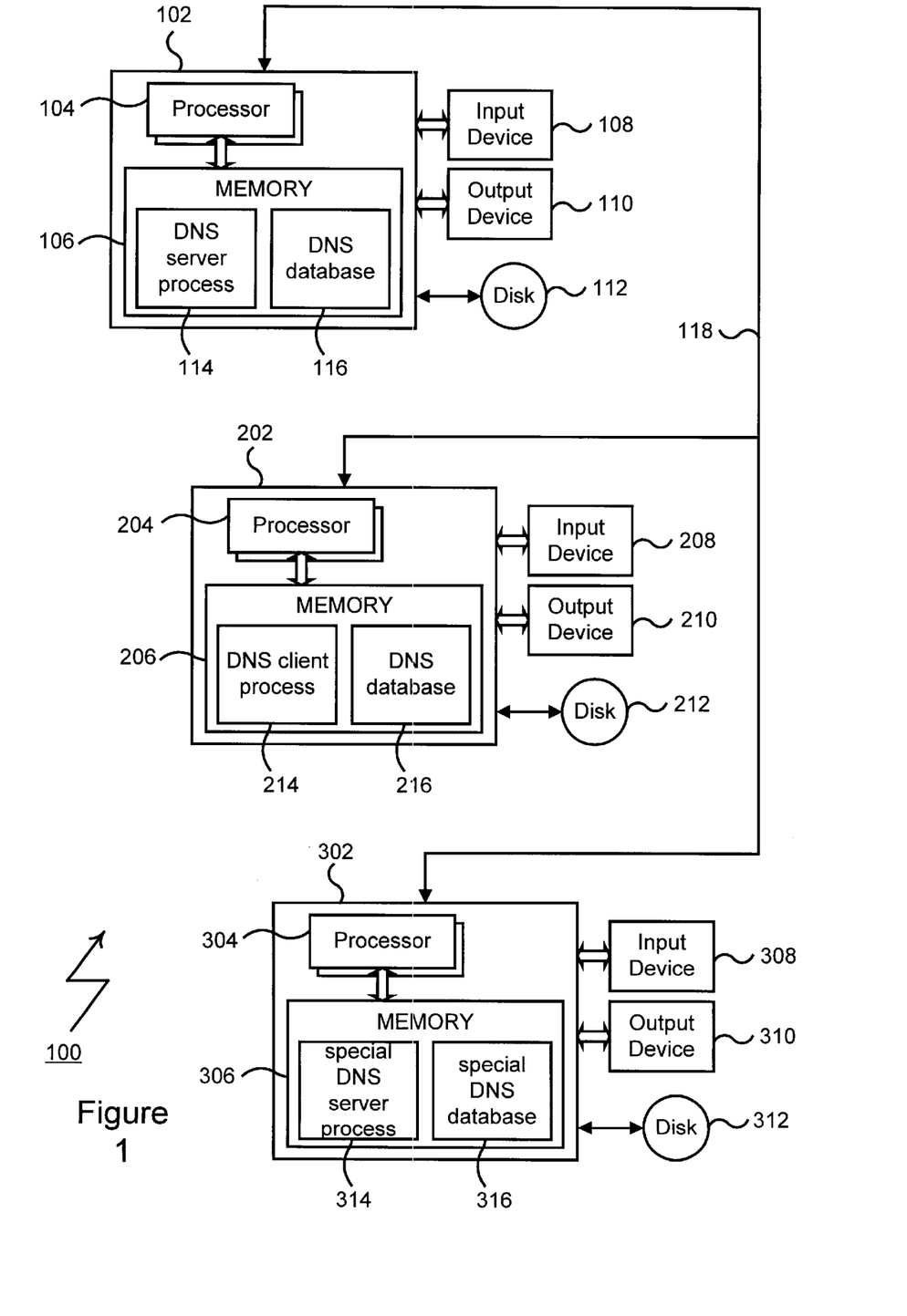
FIG. 1 is a block diagram of a computer system in accordance with a preferred embodiment of the present invention.

In FIG. 1, a data processing system 100 is shown as a representative environment for the present invention. Structurally, data processing system 100 includes a DNS server system 102 that, in turn, includes a processor, or processors 104, and a memory 106. An input device 108 and an output device 110 are connected to DNS server system 102 and represent a wide range of varying I/O devices such as disk drives, keyboards, modems, network adapters, printers and displays. A disk drive 112, of any suitable disk drive type, is shown connected to DNS server system 102. A DNS server process 114 and a DNS database 116 are shown to be resident in memory 106 of DNS server system 102. DNS server system 102 is connected to a network 118.

FIG. 1 also shows that data processing system 100 includes a client system 202. Client system 202 includes all of the components described with regard to DNS server system 102. In the case of client system 202, however, a DNS client process 214 is shown to be resident in memory 206. Client system 202 is connected to network 118.

Data processing system 100 includes a special DNS server system 302. Special DNS server system 302 includes all of the components described with regard to DNS server system 102. In the case of special DNS server system 302, however, a special DNS process 314 and a special DNS database 316 are shown to be resident in memory 306. Special DNS server system 302 is also connected to network 118. In general, it should be appreciated that, although shown as separate systems in FIG. 1, one or more of DNS server system 102, client system 202 and special DNS server system 302 may be incorporated into a single system.

Figure 2:
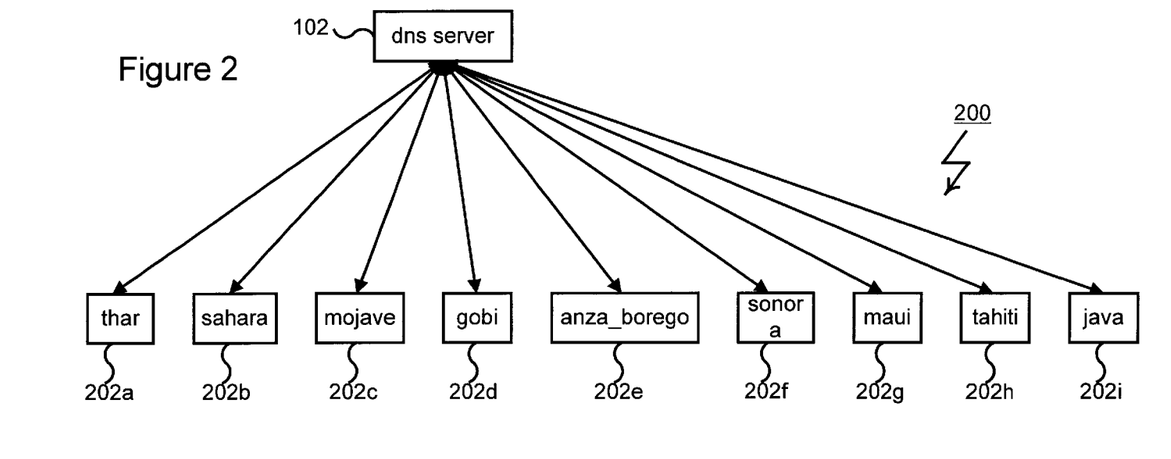
FIG. 2 is block diagram of a TCP/IP network shown as a representative environment for a preferred embodiment of the present invention.

Network 118 is preferably a TCP/IP network of the type shown in FIG. 2 and generally designated 200. Network 200 includes a series of host systems, 202a through 202i and DNS server 102. Each host system 202 has a symbolic name. For example, host system 202a has the symbolic name "thar" and host system 202i has the symbolic name "java." Each host system preferably has a thirty-two bit IP address (IP addresses for the host systems 202a though 202i are not shown). The symbolic name of each host system 202 is bound to the IP address of the host system 202. DNS database 116 includes bindings for translation of symbolic names, such as "thar," to IP addresses. Importantly, although network 200 is shown to include systems 202, other objects may be included within network 200. For example, a service provided by a specific host system 202 may have its own IP address and symbolic name. It should also be appreciated that network 202 is not limited to a single physical network. Instead, host systems 202 may be connected using a wide range of different networking methods and topologies.

Figure 3:
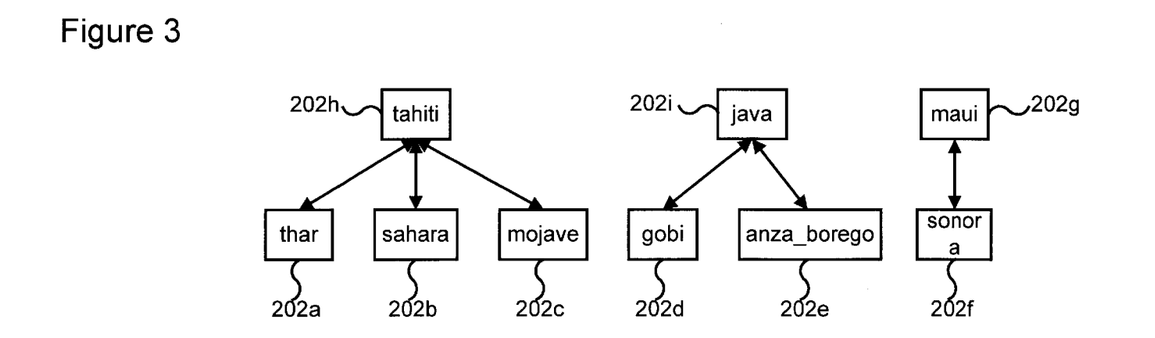
FIG. 3 is block diagram of the TCP/IP network of FIG. 2 showing a correspondence between host systems and mail servers.

Within the network 200 of FIG. 2, certain services are provided by certain host systems 202. This may be more easily appreciated by reference to FIG. 3 where host systems 202g through 202i are shown as servers for electronic mail. Each of these servers sends electronic mail to and receives electronic mail from one or more host systems 202. More specifically, it may be seen that host system 202h ("tahiti") is the mail server for host systems 202a through 202c ("thar", "sahara" and "mojave", respectively). Similarly, host system 202i ("java") is the mail server for host system 202d ("gobi") and 202e ("anza_borego") while host system 202g ("maui") is the mail server for host system 202f ("sonora"). It should be noted that the distribution of host systems 202 to mail servers is intended to be relatively static. Thus, if a particular mail server becomes available, its associated host systems 202 may wait, rather than contacting a replacement server.

Figure 4:
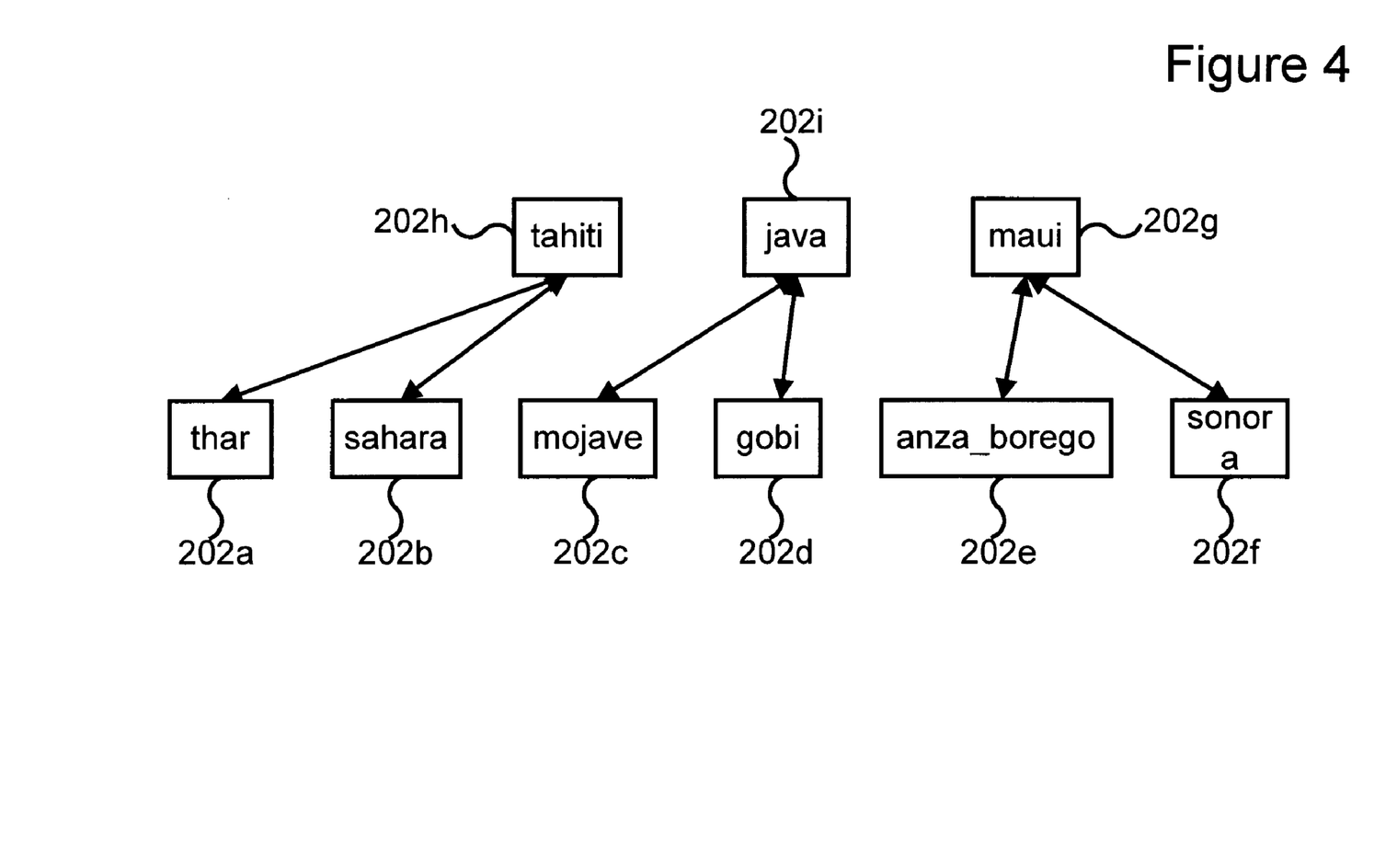
FIG. 4 is block diagram of the TCP/IP network of FIG. 2 showing a correspondence between host systems and news servers.

In FIG. 4, host systems 202g through 202i are shown as servers for electronic news. More specifically, it may be seen that host system 202h ("tahiti") is the news server for host systems 202a and 202b ("thar" and "sahara" respectively). Similarly, host system 202i ("java") is the news server for host system 202c ("mojave"), and host system 202d ("gobi") while host system 202g ("maui") is the news server for host system and 202e ("anza_borego") and host system 202f ("sonora"). When one of the news servers 202g through 202h becomes unavailable, the systems served by the unavailable news server may use one of the remaining news servers as an alternate news server. For example, if the news server 202h ("tahiti") should become unavailable, the remaining host systems 202a ("thar") and 202b ("sahara"), could use news server 202g ("maui") or news server 202i ("java") as an alternate news server.

For the present invention, each host system 202 preferably uses a predefined symbolic name for network services such as news and mail. For example, in network 200, each host system could use the symbolic host name "mail" for its mail host and the symbolic name "news" for its news host. Translation of the symbolic names may be better understood by reference to FIG. 5.

Figure 5:
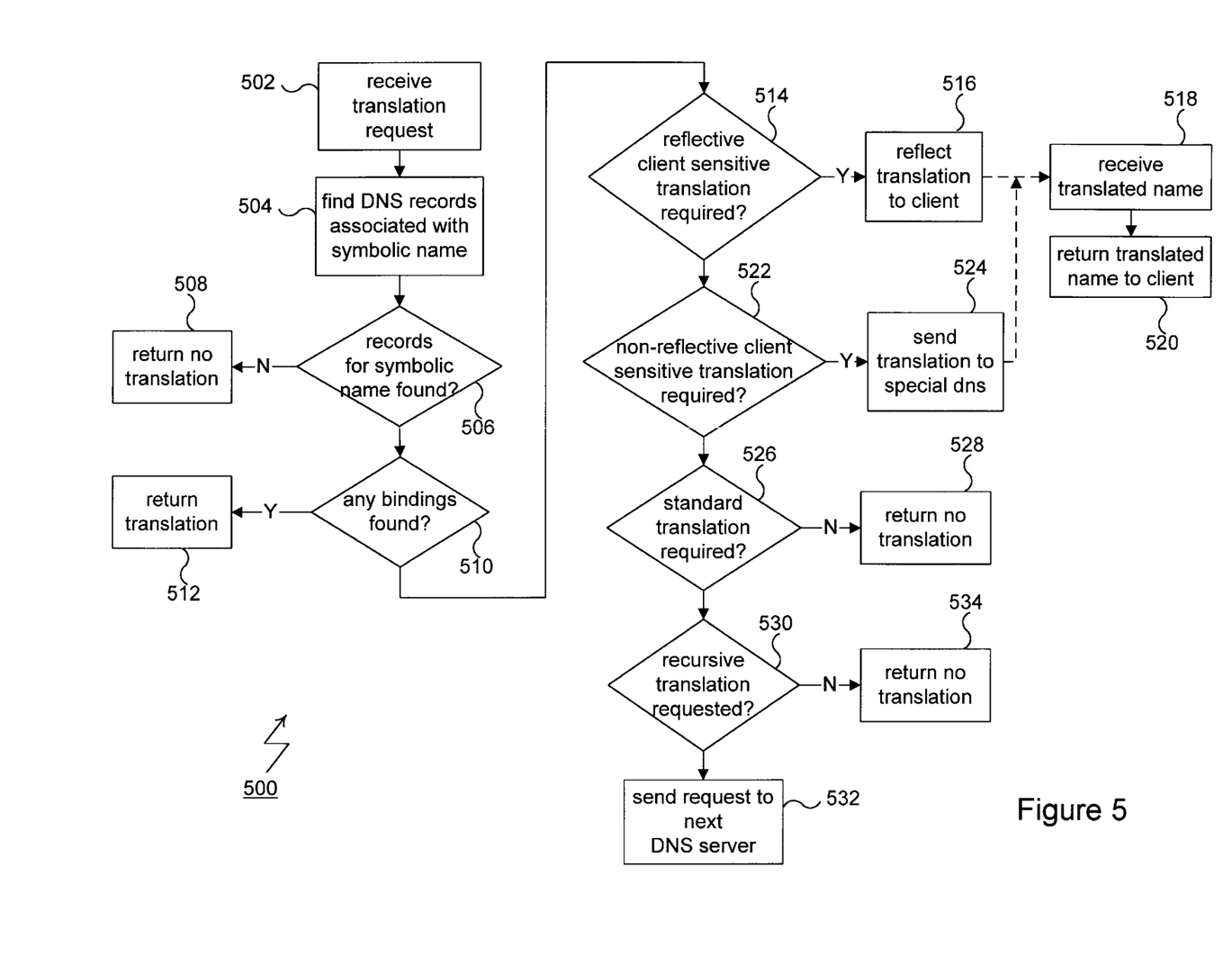
FIG. 5 is a flowchart showing the steps associated with a preferred embodiment of the name resolution method of the present invention.

In FIG. 5, a preferred embodiment of a method for name translation is shown and generally designated 500. Method 500 is performed by the DNS server system 102, executing instructions stored in memory 106. Method 500 begins with step 502 where the DNS server system 102 receives a translation request including a symbolic name (such as "mail" or "news") from a client system 202. In step 504, which follows, the DNS server system 102 searches DNS database 116 for records associated with the symbolic name included in the translation request. In step 506 the result of this search is examined, by the DNS server system 102, to determine if any associated records were found in DNS database 116. In the negative case, execution of method 500 continues at step 508 where the DNS server system 102 returns a message of no translation to the client system 202.

In the alternative, (i.e., where DNS database 116 is found to include at least one record associated with the symbolic name included in the translation request), execution of method 500 continues at step 510. In step 510, the DNS server system 102 examines the records retrieved from DNS database 116 to determine if the records include a binding for the symbolic name included in the translation request. More specifically, for the purposes of the present invention, a "binding" is an association between a symbolic name and an IP address. A record that provides a specific IP address for a symbolic name binds the IP address to the symbolic name.

If DNS database 116 includes a binding for the symbolic name included in the translation request, execution of method 500 continues at step 512. In step 512, the DNS server system 102 returns the IP address included in the record to the client system 202 as the translation for the symbolic name included in the translation request.

In the alternative (i.e., if no record is found that binds the symbolic name included in the translation request to an IP address) method 500 continues at step 514. In step 514, the records retrieved from the DNS database 116 are examined to find records that require reflective client-sensitive translation. More specifically, records within the DNS database 116 can be marked, with the marking indicating that symbolic name associated with the record requires reflective client-sensitive translation. Preferably, the records associated with reflective client-sensitive translation includes an IP port address used for reflective client-sensitive translation. Importantly, the IP port address included in the records associated with reflective client-sensitive translation is nonstandard, or different, from the port address normally used for DNS translation requests.

When step 514 determines that client-sensitive translation is required, execution of method 500 continues at step 516. In step 516, the DNS server system 102 returns, or reflects, the translation request to the client system 202. Preferably, the reflection is directed at the IP port included in the record retrieved from the DNS database 116 that had required reflective client-sensitive translation.

Figure 6:
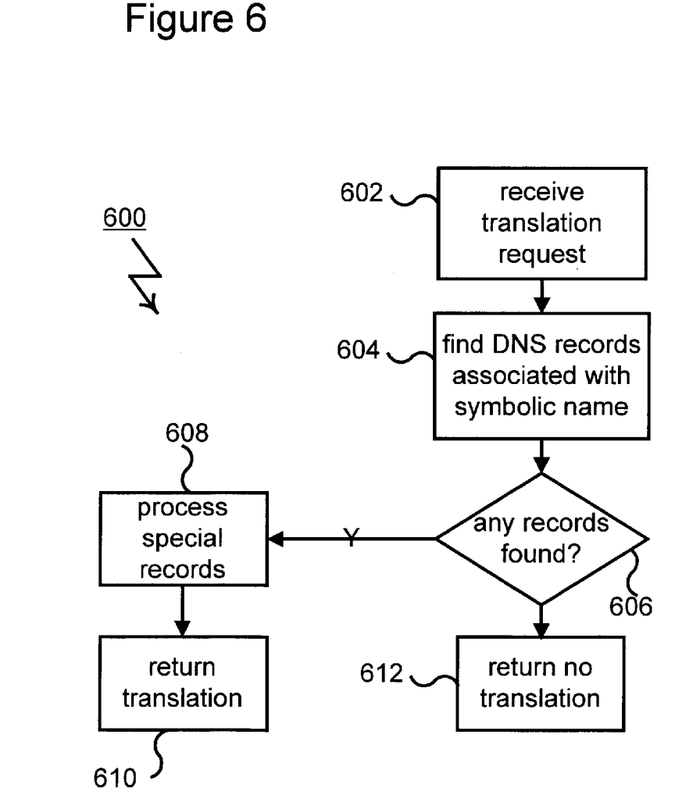
FIG. 6 is a flowchart showing the steps associated with a preferred embodiment of the reflective client-sensitive translation resolution method of the present invention.

Processing of the translation request by the client system 202 is shown as method 600 of FIG. 6. More specifically, in step 602 the reflected translation request is received by the client system 202. Typically, step 602 is accomplished by awakening DNS client process 214 each time a message is sent to the special port dedicated to the receipt of reflected DNS requests. DNS client process 214 then reads the translation request sent to the special port in step 516.

In step 604, DNS client process 214 searches client DNS database 216 for records associated with the symbolic name included in the translation request. This search is generally similar to the database search performed by the DNS server system 102. In the case of the step 602, however, a special set of records are searched. These records include bindings that are preloaded into the client system 202 and are sensitive to the specific identity of the client system 202. For example, the records in the client DNS database 216 of client system 202b ("sahara") will including a binding mapping "mail" to client system 202h ("tahiti"). (Recall that "tahiti" is the mail server for "sahara" in the network 200 of FIG. 3). Alternatively, instead of preloading the client system 202 with a special set of bindings, DNS client process 214 may be implemented as a Java® program that includes the necessary bindings. (Java® is a registered trademark of Sun Microsystems, Inc.) The Java® program can be downloaded and executed as part of an initialization step for the client system 202. The result of the translation of step 604 is the generation of an IP address for the symbolic name included in the translation request with the translation being sensitive to the identity of the client system 202 requesting the translation.

The type of bindings that are included in the client DNS database 216 define the type of translation to be performed. For example, some of the records included in the client DNS database 216 may include a specific binding for a particular symbolic name. This corresponds to cases, such as electronic mail, where it is desirable to have the client system 202 use only a single server.

In other cases, it will be desirable to select a preferred address from a group of available addresses. This is accomplished including a special type of record in the client DNS database 216. Each special record includes a preferred IP address and a symbolic name corresponding to the group of available addresses. For example, a special record might include a preferred IP address along with the symbolic name "available-news." This corresponds to cases, such as electronic news, where a particular server is preferred, but where alternate servers may substitute if the preferred server becomes busy or unavailable.

In other cases, it will be desirable to account for the identity of a user of the client system 202 when performing the translation of a symbolic name. This is accomplished by including another type of special record in the client DNS database 216 indicating that user identity must be used when selecting the binding for a particular symbolic name.

In step 606, the results of the search of step 604 are examined, by the DNS client process 214, to determine if any records associated with the symbolic name were found in the client DNS database 216. In the case that no record is found that corresponds to the symbolic name included in the translation request, execution of method 600 continues at step 610 where a value of no translation is returned, by the client system 202, to the DNS server system 102. In the alternative, (i.e., where DNS client process 214 finds an associated record in the client DNS database 216), execution of method 600 continues at step 608.

In step 608, the DNS client process 214 examines the record retrieved from the client DNS database 216. If the record is one of the special types described above, the DNS client process 214 performs the requested translation. For example, if the record includes a symbolic name and a preferred IP address, the client DNS process 214 translates the symbolic name to generate a list of all IP addresses that correspond to the symbolic name. Preferably, this translation is performed by sending a DNS request to the DNS server system 102. After translating the symbolic name, the client DNS process 214 tests to see if the preferred address is included in the list of addresses. If the preferred address is included in the list of addresses, then the preferred address is selected. If the preferred address is not included, the client DNS process 214 selects one of the other addresses. When an alternate address is selected, the client DNS process 214 may optionally update the client database to indicate that the selected address is now the preferred address.

In step 610, the client DNS process 214 returns the IP address that corresponds to the translation request to the DNS server system 102. In cases where a special record was retrieved from the client DNS database 216, the returned IP address is the IP address generated in step 608. In other cases, the returned IP address is the IP address included in the record retrieved from the client DNS database 216.

In step 518, the DNS server system 102 receives the result of the reflective client-sensitive translation. More specifically, it may be recalled that the client system 202 returns either a value of no translation (see step 610 of method 600) or a translation for the symbolic name included in the translation request (see step 608 of method 600). In step 518, the returned value of no translation or the returned translation is received by the DNS server system 102. In step 520, the value received by the DNS server system 102 in step 518 is returned to the client system 202 as the translation for the symbolic name included in the translation request.

When step 514 determines that client-sensitive translation is not required, execution of method 500 continues at step 522. In step 522, the records retrieved from the DNS database 116 are examined, by the DNS server system 102, to find records that require non-reflective client-sensitive translation. More specifically, records within the DNS databases 116 can be marked, with the marking indicating that symbolic name associated with the record requires non-reflective client-sensitive translation. Preferably, the records associated with non-reflective client-sensitive translation include the symbolic name of a special DNS server system 302 and port address that are used for non-reflective client-sensitive translation.

When step 522 determines that non-reflective client-sensitive translation is required, execution of method 500 continues at step 524. In step 524, the DNS server system 102 sends a extended translation request to a special DNS server system 302. Preferably, the extended translation request is sent to the port and special DNS server system 302 identified in the record retrieved from the DNS database 116. The identity of the client system 202 that had requested translation of the symbolic name is embedded, by the DNS server system 102, in the extended translation request.

Figure 7:
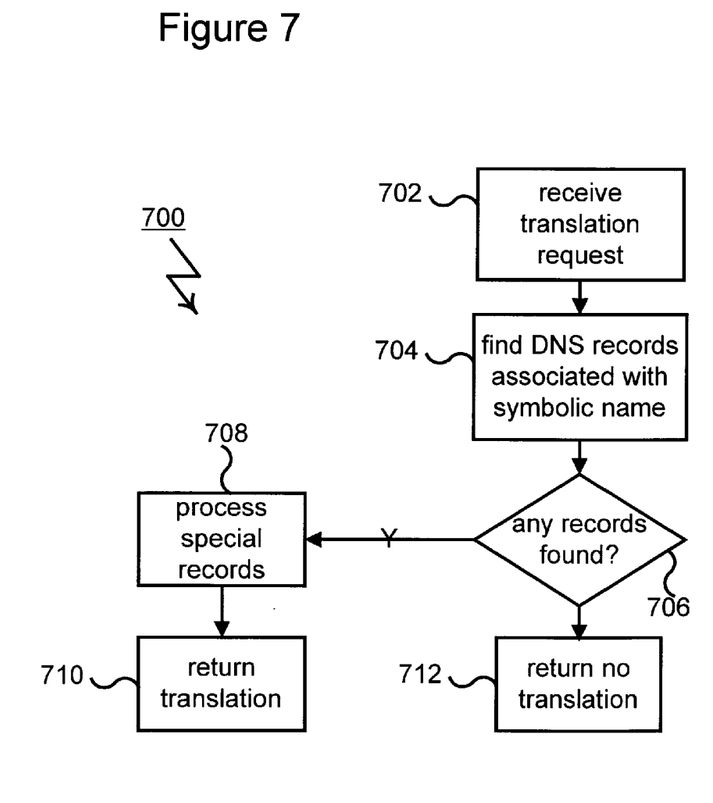
FIG. 7 is a flowchart showing the steps associated with a preferred embodiment of the non-reflective client-sensitive translation resolution method of the present invention.

Processing of the extended translation request by the special DNS server system 302 is shown as method 700 of FIG. 7. More specifically, in step 702, the extended translation request is received by the special DNS server system 302. In step 704, the special DNS server system 302 searches special DNS database 316 for records associated with the symbolic name included in the translation request. This search is generally similar to the database search performed by the DNS server system 102. In the case of step 704, however, it should be noted that the special DNS server system 302 uses the identity of the client system 202 that was passed in the extended translation request. Thus, the special DNS server system 302 will be preferably preloaded with a set of bindings that include client-sensitive translations for all client systems 202 that use the DNS server system 102 and special DNS server system 302. For example, if the symbolic name "mail" is being resolved and the client system 202b ("sahara") is requesting the translation of "mail", then the bindings preloaded into the special DNS server system 302 would include a binding of "mail" to client system 202h ("tahiti") for client system 202b ("sahara"). The result of the translation of step 704 is the generation of an IP address for the symbolic name included in the translation request with the translation being sensitive to the identity of the client system 202 requesting the translation.

The type of bindings that are included in the special DNS server system 302 define the type of translation to be performed. For example, some of the records included in the special DNS server system 302 may include a specific binding for a particular symbolic name. This corresponds to cases, such as electronic mail, where it is desirable to have the client system 202 use only a single server.

In other cases, it will be desirable to select a preferred address from a group of available addresses. This is accomplished including a special type of record in the special DNS server system 302. Each special record includes a preferred IP address and a symbolic name corresponding to the group of available addresses. For example, a special record might include a preferred IP address along with the symbolic name "available-news." This corresponds to cases, such as electronic news, where a particular server is preferred, but where alternate servers may substitute if the preferred server becomes busy or unavailable.

In other cases, it will be desirable to account for the identity of a user of the client system 202 when performing the translation of a symbolic name. This is accomplished by including another type of special record in the special DNS server system 302 indicating that user identity must be used when selecting the binding for a particular symbolic name.

In step 706, the results of the search of step 704 are examined, by the special DNS server system 302, to determine if any records associated with the symbolic name were found in the special DNS server system 302. In the case that no record is found that corresponds to the symbolic name included in the translation request, execution of method 700 continues at step 710 where a value of no translation is returned, by the special DNS system 302, to the DNS server system 102. In the alternative, (i.e., where special DNS server system 302 finds an associated record in the special DNS server system 302), execution of method 700 continues at step 708.

In step 708, the special DNS server system 302 examines the record retrieved from the special DNS server system 302. If the record is one of the special types described above, the special DNS server system 302 performs the requested translation. For example, if the record includes a symbolic name and a preferred IP address, the client DNS process 214 translates the symbolic name to generate a list of all IP addresses that correspond to the symbolic name. Preferably, this translation is performed by sending a DNS request to the DNS server system 102. After translating the symbolic name, the special DNS process 314 tests to see if the preferred address is included in the list of addresses. If the preferred address is included in the list of addresses, then the preferred address is selected. If the preferred address is not included, the special DNS process 314 selects one of the other addresses. When an alternate address is selected, the special DNS process 314 may optionally update its database to indicate that the selected address is now the preferred address for that client.

In step 710, the special DNS process 314 returns the IP address that corresponds to the translation request to the DNS server system 102. In cases where a special record was retrieved from the special DNS server system 302, the returned IP address is the IP address generated in step 708. In other cases, the returned IP address is the IP address included in the IP address included in the record retrieved from the special DNS server system 302.

In step 518, the DNS server system 102 receives the result of the non-reflective client-sensitive translation. More specifically, it may be recalled that the special system 302 returns either a value of no translation (see step 710 of method 700) or a translation for the symbolic name included in the translation request (see step 708 of method 700). In step 518, the returned value of no translation or the returned translation is received by the DNS server system 102. In step 520, the value received by the DNS server system 102 in step 518 is returned to the client system 202 as the translation for the symbolic name included in the translation request.

When step 522 determines that non-reflective client-sensitive translation is not required, execution of method 500 continues at step 526. In step 526, the records retrieved from the DNS database 116 are examined, by the DNS server system 102, to find records that require standard (i.e., not client-sensitive translation) DNS translation. If no record requiring standard DNS translation has been retrieved from the DNS database 116, the DNS server system 102, in step 528, returns a value of no translation to the client system 202. Alternatively, execution continues at step 530 where the translation request is examined to determine if recursive translation has been requested. If recursive translation has been requested, execution continues at step 532. In step 532 the translation request is passed to a higher level DNS server system 102 for translation. If recursive translation is not requested, execution continues at step 534, where a response of no translation is passed to the client system 202. Step 534 indicates that the DNS server system 102 was unable to locate a binding for the symbolic name included in the translation request.

In general, it may be seen that the foregoing description of method 500 includes two preferred methods for client-sensitive translation. Namely, method 500 includes both reflective and non-reflective client-sensitive translation. Importantly, however, it is to be appreciated that the present invention anticipates that it is entirely practical to fabricate DNS server systems 102 that use only one of these two methods Thus, DNS server systems 102 that use only reflective client-sensitive translation, or only non-reflective client-sensitive translation may be fabricated without departing from the spirit of the present invention.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for providing client-sensitive translation of symbolic names to addresses, the method comprising the following steps performed by a DNS server system, of:

receiving a request for translation from a client computer system, the request for translation including a symbolic name to be translated;

forwarding the translation request to the client computer system if reflective client-sensitive translation is required;

receiving a translation from the client computer system, the translation including an address corresponding to the symbolic name included in the translation request; and returning the translation to the client computer system.

2. A method as recited in claim 1 wherein the translation request sent by the DNS server system to the client system is directed to a non-standard port address, the non-standard port address differing from the port address normally used for DNS translation requests.

3. A method as recited in claim 1 further comprising the steps, performed by the client system of:

receiving the request for translation from the DNS server system;

searching a database of records, each record including a symbolic name;

selecting a record having a symbolic name that matches the symbolic name included in the translation request, the record including an address associated with the symbolic name; and returning the address associated with the symbolic name to the DNS server system.

4. A method as recited in claim 1 further comprising the steps, performed by the client system of:

receiving the request for translation from the DNS server system;

searching a database of records, each record including a symbolic name;

selecting a record having a symbolic name that matches the symbolic name included in the translation request, the record including a preferred address and a symbolic name associated with a group of available addresses;

translating the symbolic name associated with the group of available address to generate a list of available addresses;

returning the preferred address to the DNS server system if the preferred address is included in the list of available addresses; and returning an addresses in the list of available addresses to the DNS server system if the preferred address is not included in the list of available addresses.

5. A method as recited in claim 1 further comprising the steps, performed by the DNS server, of:

forwarding the translation request to a special DNS server system if non-reflective client-sensitive translation is required;

receiving a translation from the special DNS server system, the translation including an address corresponding to the symbolic name included in the translation request; and returning the translation to the client computer system.

6. A method as recited in claim 5 further comprising the steps, performed by the special DNS server system of:

receiving the request for translation from the DNS server system;

searching a database of records, each record including a symbolic name;

selecting a record having a symbolic name that matches the symbolic name included in the translation request, the record including an address associated with the symbolic name; and returning the address associated with the symbolic name to the DNS server system.

7. A method as recited in claim 5 further comprising the steps, performed by the special DNS server system of:

receiving the request for translation from the DNS server system;

searching a database of records, each record including a symbolic name;

selecting a record having a symbolic name that matches the symbolic name included in the translation request, the record including a preferred address and a symbolic name associated with a group of available addresses;

translating the symbolic name associated with the group of available address to generate a list of available addresses;

returning the preferred address to the DNS server system if the preferred address is included in the list of available addresses; and returning an addresses in the list of available addresses to the DNS server system if the preferred address is not included in the list of available addresses.

8. A method as recited in claim 5 wherein the step of forwarding the forwarding the translation request to a special DNS server system is performed by encoding the translation request in an extended translation request, the extended translation request including the identity of the client system.

9. A method as recited in claim 1 further comprising the steps, performed by the DNS server, of:
   forwarding the translation request to a second DNS server system if neither reflective client-sensitive translation or non-reflective client-sensitive translation are required;
   receiving a translation from the second DNS server system, the translation including an address corresponding to the symbolic name included in the translation request; and
   returning the translation to the client computer system.

10. A method as recited in claim 1 further comprising the step of returning an address if the DNS server includes a record binding the address to the symbolic name included in the translation request.

11. A method for providing client-sensitive translation of symbolic names to addresses, the method comprising the following steps performed by a DNS server system, of:
   receiving a request for translation from a client computer system, the request for translation including a symbolic name to be translated;
   forwarding the translation request to a special DNS server system if non-reflective client-sensitive translation is required;
   receiving a translation from the special DNS server system, the translation including an address corresponding to the symbolic name included in the translation request; and
   returning the translation to the client computer system.

12. A method as recited in claim 11 wherein the step of forwarding the forwarding the translation request to a special DNS server system is performed by encoding the translation request in an extended translation request, the extended translation request including the identity of the client system.

13. A method as recited in claim 11 further comprising the steps, performed by the special DNS server system of:
   receiving the request for translation from the DNS server system;
   searching a database of records, each record including a symbolic name;
   selecting a record having a symbolic name that matches the symbolic name included in the translation request, the record including an address associated with the symbolic name; and
   returning the address associated with the symbolic name to the DNS server system.

14. A method as recited in claim 11 further comprising the steps, performed by the special DNS server system of:
   receiving the request for translation from the DNS server system;
   searching a database of records, each record including a symbolic name;
   selecting a record having a symbolic name that matches the symbolic name included in the translation request, the record including a preferred address and a symbolic name associated with a group of available addresses;
   translating the symbolic name associated with the group of available address to generate a list of available addresses;
   returning the preferred address to the DNS server system if the preferred address is included in the list of available addresses; and
   returning an addresses in the list of available addresses to the DNS server system if the preferred address is not included in the list of available addresses.

15. A method as recited in claim 11 further comprising the steps, performed by the DNS server, of:
   forwarding the translation request to the client computer system if reflective client-sensitive translation is required;
   receiving a translation from the client computer system, the translation including an address corresponding to the symbolic name included in the translation request; and
   returning the translation to the client computer system.

16. A method as recited in claim 15 further comprising the steps, performed by the client system of:
   receiving the request for translation from the DNS server system;
   searching a database of records, each record including a symbolic name;
   selecting a record having a symbolic name that matches the symbolic name included in the translation request, the record including an address associated with the symbolic name; and
   returning the address associated with the symbolic name to the DNS server system.

17. A method as recited in claim 15 further comprising the steps, performed by the client system of:
   receiving the request for translation from the DNS server system;
   searching a database of records, each record including a symbolic name;
   selecting a record having a symbolic name that matches the symbolic name included in the translation request, the record including a preferred address and a symbolic name associated with a group of available addresses;
   translating the symbolic name associated with the group of available address to generate a list of available addresses;
   returning the preferred address to the DNS server system if the preferred address is included in the list of available addresses; and
   returning an addresses in the list of available addresses to the DNS server system if the preferred address is not included in the list of available addresses.

18. A method as recited in claim 15 wherein the translation request sent by the DNS server system to the client system is directed to a non-standard port address, the non-standard port address differing from the port address normally used for DNS translation requests.

19. A method as recited in claim 11 further comprising the steps, performed by the DNS server, of:
   forwarding the translation request to a second DNS server system if neither reflective client-sensitive translation or non-reflective client-sensitive translation are required;
   receiving a translation from the second DNS server system, the translation including an address corresponding to the symbolic name included in the translation request; and
   returning the translation to the client computer system.

20. A method as recited in claim 11 further comprising the step of returning an address if the DNS server includes a record binding the address to the symbolic name included in the translation request.

21. An apparatus for providing client-sensitive translation of symbolic names to addresses, the apparatus comprising:
   a first portion configured to allow a computer system to receive a request for translation from a client computer system, the request for translation including a symbolic name to be translated;

a second portion configured to cause the computer system to forward the translation request to the client computer system if reflective client-sensitive translation is required;

a third portion configured to cause the computer system to receive a translation from the client computer system, the translation including an address corresponding to the symbolic name included in the translation request; and a fourth portion configured to cause the computer system to return the translation to the client computer system.

22. An apparatus as recited in claim 21 further comprising:

a fifth portion configured to cause the computer system to forward the translation request to a special DNS server system if non-reflective client-sensitive translation is required;

a sixth portion configured to cause the computer system to receive a translation from the special DNS server system, the translation including an address corresponding to the symbolic name included in the translation request; and an seventh portion configured to cause the computer system to return the translation to the client computer system.

23. An apparatus as recited in claim 21 further comprising:

a fifth portion configured to cause the computer system to return an address if the DNS server includes a record binding the address to the symbolic name included in the translation request.

24. An apparatus for providing client-sensitive translation of symbolic names to addresses, the apparatus comprising:

a first portion configured to allow a computer system to receive a request for translation from a client computer system, the request for translation including a symbolic name to be translated;

a second portion configured to cause the computer system to forward the translation request to a special DNS server system if non-reflective client-sensitive translation is required;

a third portion configured to cause the computer system to receive a translation from the special DNS server system, the translation including an address corresponding to the symbolic name included in the translation request; and a fourth portion configured to cause the computer system to return the translation to the client computer system.

25. An apparatus as recited in claim 24 further comprising:

a fifth portion configured to cause the computer system to forward the translation request to the client computer system if reflective client-sensitive translation is required;

a sixth portion configured to cause the computer system to receive a translation from the client computer system, the translation including an address corresponding to the symbolic name included in the translation request; and an seventh portion configured to cause the computer system to return the translation to the client computer system.

26. An apparatus as recited in claim 24 further comprising a fifth portion configured to cause the computer system to return an address if the DNS server includes a record binding the address to the symbolic name included in the translation request.

27. A computer program product comprising:

a computer usable medium having computer readable code embodied therein for providing client-sensitive translation of symbolic names to addresses, the computer program product comprising:

first computer readable program code devices configured to allow a computer system to receive a request for translation from a client computer system, the request for translation including a symbolic name to be translated;

second computer readable program code devices configured to cause the computer system to forward the translation request to the client computer system if reflective client-sensitive translation is required;

third computer readable program code devices configured to cause the computer system to receive a translation from the client computer system, the translation including an address corresponding to the symbolic name included in the translation request; and fourth computer readable program code devices configured to cause the computer system to return the translation to the client computer system.

28. A computer program product as recited in claim 27 further comprising fifth computer readable program code devices configured to cause the computer system to return an address if the DNS server includes a record binding the address to the symbolic name included in the translation request.

29. A computer program product comprising:

a computer usable medium having computer readable code embodied therein for providing client-sensitive translation of symbolic names to addresses, the computer program product comprising:

first computer readable program code devices configured to allow a computer system to receive a request for translation from a client computer system, the request for translation including a symbolic name to be translated;

second computer readable program code devices configured to cause the computer system to forward the translation request to a special DNS server system if non-reflective client-sensitive translation is required;

third computer readable program code devices configured to cause the computer system to receive a translation from the special DNS server system, the translation including an address corresponding to the symbolic name included in the translation request; and fourth computer readable program code devices configured to cause the computer system to return the translation to the client computer system.

30. A computer program product as recited in claim 29 further comprising:

fifth computer readable program code devices configured to cause the computer system to forward the translation request to the client computer system if reflective client-sensitive translation is required;

sixth computer readable program code devices configured to cause the computer system to receive a translation from the client computer system, the translation including an address corresponding to the symbolic name included in the translation request; and seventh computer readable program code devices configured to cause the computer system to return the translation to the client computer system.

31. A computer program product as recited in claim 29 further comprising fifth computer readable program code devices configured to cause the computer system to return an address if the DNS server includes a record binding the address to the symbolic name included in the translation request.

32. A computer program product as recited in claim 27 further comprising:

fifth computer readable program code devices configured to cause the computer system to forward the translation request to a special DNS server system if non-reflective client-sensitive translation is required;

sixth computer readable program code devices configured to cause the computer system to receive a translation from the special DNS server system, the translation including an address corresponding to the symbolic name included in the translation request; and seventh computer readable program code devices configured to cause the computer system to return the translation to the client computer system.

* * * * *